United States Patent [19]
Driskell

[11] 3,804,977
[45] Apr. 16, 1974

[54] COLORED RUNNING LIGHT SIMULATOR

[75] Inventor: Carl R. Driskell, Winter Park, Fla.

[73] Assignee: The United States of America as represented by the Secretary of the Navy, Washington, D.C.

[22] Filed: Nov. 20, 1972

[21] Appl. No.: 307,882

[52] U.S. Cl......... 178/6.8, 178/DIG. 35, 178/5.4 R, 35/10.2, 35/11
[51] Int. Cl. ............................................. H04n 9/02
[58] Field of Search.......... 178/6.8, DIG. 35, 5.4 R; 35/10.2, 12

[56] References Cited
UNITED STATES PATENTS
3,748,374  7/1973  Curran................................ 178/6.8
3,585,281  6/1971  Jordan............................. 178/5.4 E Primary Examiner—Robert L. Griffin
Assistant Examiner—Edward L. Coles
Attorney, Agent, or Firm—R. S. Sciascia; J. W. Pease; J. F. Miller

[57] ABSTRACT

In a periscope view simulator training device wherein a dynamic scene including ships at sea is displayed on a television monitor, colored running lights are provided for the displayed ships. This is accomplished using video signals from monochrome cameras.

6 Claims, 1 Drawing Figure

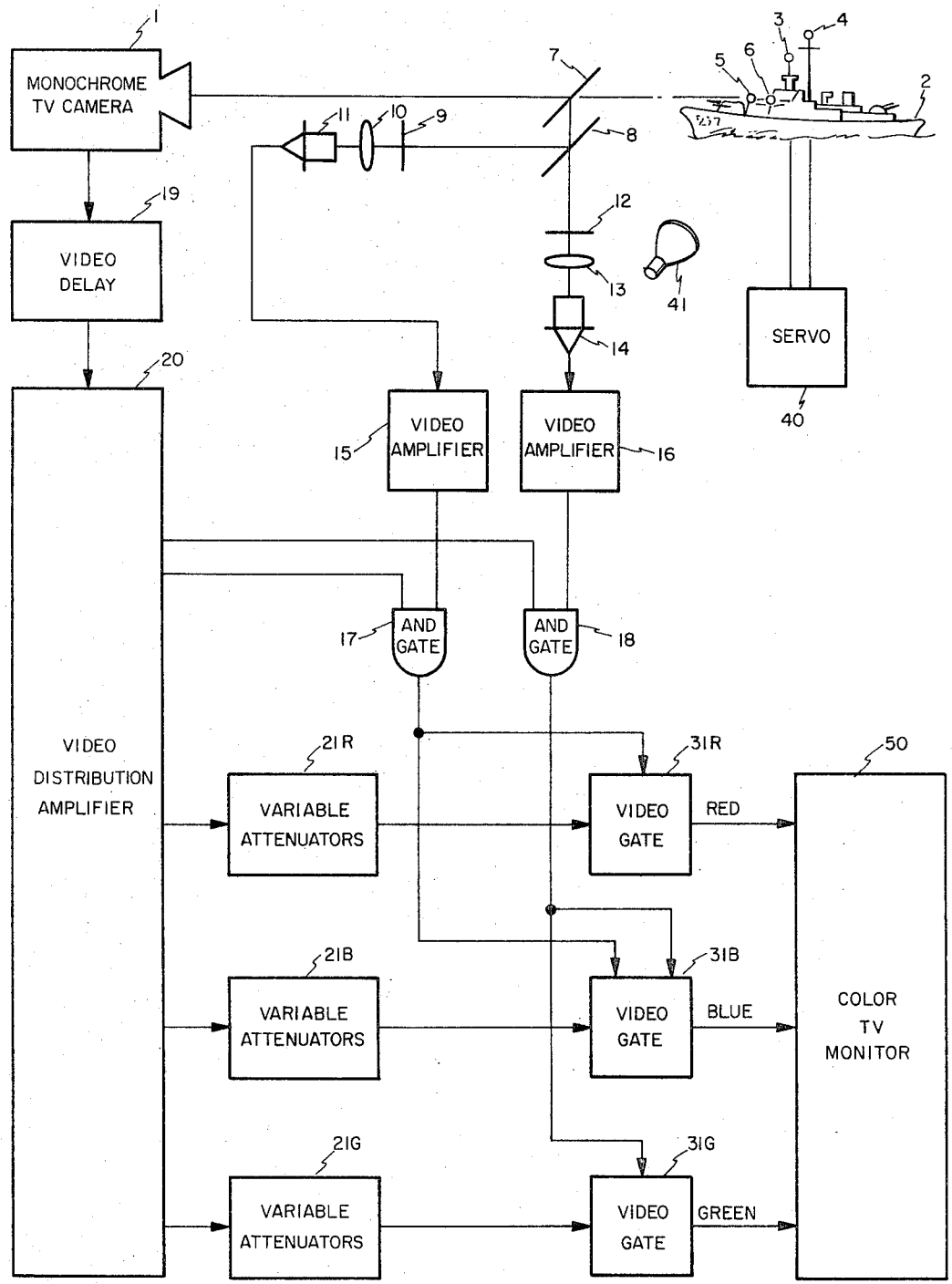

COLORED RUNNING LIGHT SIMULATOR

BACKGROUND OF THE INVENTION

The invention is in the field of training devices, particularly those employing television apparatus for simulation.

In the prior art, television systems in training devices generate a live scene to provide a realistic environment for a training apparatus. One such device is a periscope view simulator described in U.S. Pat. Nos. 3,420,953; 3,497,614 and 3,507,990. This device generates a televised scene on a monitor which is viewed through a periscope by a trainee in a submarine mockup. The video information for displaying ships in such a scene is derived from one or more black-and-white television cameras, each of which is trained on a model of a particular ship. It has been necessary to use monochrome cameras to observe the ship models because of several practical difficulties experienced with color cameras in such a system. Among these is the difficulty of synchronizing the scanning patterns of several color cameras because in the trainer the camera sweep voltage rates are frequently changed to simulate a change in the range of a particular ship in the scene displayed. By "range" is meant the apparent distance of a ship from the periscope objective which is the observer's viewpoint. Sweep voltages are delayed to simulate a change in ship position. Additionally, the use of color cameras makes the cost of the system excessive as compared to the cost using monochrome cameras.

The lack of color capability has limited the effectiveness of prior art trainers because of the impossibility of generating a realistic scene to simulate night-time conditions. While a dark scene simulating reduced visibility could be generated, the lighting arrangements of ships at sea could not be simulated.

Since a principal tactic employed by submarines is the surprise attack enabled by stalking and waylaying maneuvers, often at night, the lack of night-time simulation capability has seriously impaired the effectiveness of the prior art trainers.

Applicant's copending application Ser. No. 256,038 (now U.S. Pat. No. 3,769,458) filed May 23, 1972 discloses apparatus for displaying white running lights. This invention provides colored running lights and/or other lighting effects for the ships in the televised scene displayed. This enables a realistic simulation of a marine environment at night and greatly enhances the capability and effectiveness of prior art trainers. Furthermore, this is accomplished using black and white cameras only, thus overcoming the expense and electronic problems associated with the use of color cameras.

SUMMARY OF THE INVENTION

The invention provides colored running and/or other lights for ships in a televised scene. These ships move around in the scene so that the number, color, and position of the lights observable will vary with the position and attitude of a ship. This provides cues as to attitude range and position to trainee submarine personnel observing the scene through a periscope. While a color television monitor is used to display the scene the video information representing ships is derived from monochrome cameras. Novel circuitry for adding color information to monochrome video information representing the ships is provided to simulate the appearance of colored shipboard lights. Additional novel circuitry is provided to change the color of the lights observable on a particular ship in accordance with changes in the position and attitude of the ship.

BRIEF DESCRIPTION OF THE DRAWING

The drawing is a block diagram of the invention.

DESCRIPTION OF THE PREFERRED EMBODIMENT

In the periscope view simulator described in the aforementioned patents one or more monochrome cameras each observe a respective model of a ship. (Some cameras may observe models of planes, submarines, etc. but this disclosure will be restricted to a discussion of ships for the sake of simplicity.) The ship model is identical in appearance with a real ship and is rotatably mounted to be rotated by a computer controlled servo system. Thus when a ship model is rotated, the ship's image in the televised scene observed through a periscope is seen to turn. A ship's image is caused to move across the scene by delaying camera sweep voltage with respect to monitor sweep voltage. The apparent range of a particular ship is changed by adjusting the sweep voltage rate. Combined controls enable an operator or programmer to effect any desired maneuvers of any ship or ships in the observed scene.

The invention provides a second ship model for each ship model used in the trainer. This second model is identical to the realistic model used for daytime simulation except that it is colored a non-reflective black and is placed in front of a non-reflective background. As shown in the drawing the second model has colored spheres affixed in the position of the running lights found on real ships. The second or black model is driven by a servo which may be the same servo that drives the daytime model and is observed by a monochrome camera which may be the same camera which observes the daytime model. For night-time operations it is necessary to insert a beam splitter in the optical path between the camera and the second model. Thus a separate ship or "target" channel is provided for each camera for night-time simulation.

The drawing illustrates a typical target channel which will provide realistic red, green and white running lights for simulation of night-time scenes. In a bow-on aspect of the model shown all lights, red, green and white, will be displayed in proper perspective. When viewed from the port side, only the red and white lights will be displayed. Similarly, when viewed from the starboard side, only the green and white lights will be displayed. The switching of lights takes place automatically with target model rotation. The target ship model 2 shown is rotated by a servo 40 in response to commands from a computer not shown. The computer and servo system are not part of this invention but are taught in the aforementioned patents. A monochrome TV camera 1 views, through a beamsplitter 7, target model 2 which is illuminated by a lamp 41. Target model 2 is painted a nonreflective flat black color except for the running lights and may be positioned in front of a nonreflective background. Small colored spheres are mounted in the proper position of each light on target model 2. Blue spheres 3 and 4 are mounted at the normal positions of the white lights at the top of each mast. These spheres are painted blue so that they will not be visible to the detectors that activate the red and green lights. A green sphere 5 is mounted on the starboard side of model 2 and a red sphere 6 is mounted on port side. The red and green spheres are mounted in such way that the green sphere is visible only from the starboard side of the model, and the red sphere is visible only from the port side. Both the red and green spheres are visible from a bow-on aspect.

A video signal corresponding to each unhidden colored sphere is transmitted by TV camera 1 through a video delay 19 and video distribution amplifier 20 having multiple outputs to AND gates 17 and 18 and variable attenuators 21R, 21B and 21G. The video signals from variable attenuators 21R, 21B and 21G are fed respectively through video gates 31R, 31B and 31G to the red, blue and green electron guns of a color TV monitor 50. Since masthead lights 3 and 4 must appear as sources of white light on a monitor 50, color mix for white light is set by adjusting variable attenuators 21R, 21B and 21G. The function of the variable attenuators could be performed in video distribution amplifier 20 by providing variable gain output stages.

Beam splitter 7 reflects part of the light reflected from target model 2 to beamsplitter 8. Part of the light is reflected by beam splitter 8 through a green filter 9 and a lens 10 to photo diode 11. The remainder of the light is transmitted through beamsplitter 8, red filter 12 and lens 13 to photo diode 14. Lenses 10 and 13 focus the green and red light on photo diodes 11 and 14 respectively.

When target model 2 is rotated so that green sphere 5 is visible to beam splitter 7, a signal indicative of the green light is fed by photo diode 11 through a video amplifier 15 to enable AND gate 17. When a video signal, indicative of green light, is fed by video distribution amplifier 20 to AND gate 17, inhibit signals are fed from AND gate 17 to video gates 31R and 31B. In this state, the red and blue video inputs are inhibited so that only the green video signal is transmitted to color TV monitor 50. Similarly, when target model 2 is rotated so that red sphere 6 is visible to beam splitter 7, a signal indicative of the red light is fed by photo diode 14 through a video amplifier 16 to enable AND gate 18. When a video signal indicative of the red light is fed by distribution amplifier 20 to AND gate 18, inhibit signals are fed from AND gate 18 to video gates 31B and 31G so that only the red video signal is fed to color TV monitor 50. Hence, the running lights are displayed in proper position and aspect on a line-by-line basis. White running lights are displayed on TV monitor 50 when TV camera 1 scans blue spheres 3 and 4, a green light is displayed when green sphere 5 is scanned and a red light is displayed when red sphere 6 is scanned. A video delay 19 delays the video signal from TV camera 1 so that the total delay in the video signal between TV camera 1 and video gates 31R, 31B and 31G is the same as the delay in control signals between photo diodes 11 and 14 and video gates 31R, 31B and 31G.

The invention provides a means of deriving a realistic display of a ship's colored running lights from monochrome television camera 1. Any number of white lights can be provided. Red and green running lights are displayed realistically so that only the light or combination of lights that would normally be visible to an observer are displayed on the TV monitor. The red and green lights are switched off when they would normally be hidden from view. The lights can be made to move about realistically within or out of the periscope field of view.

What is claimed is:

1. In a training device wherein a televised picture is displayed on a monitor to simulate a marine scene, the improvement comprising:
   a model having colored spheres positioned thereon to simulate lights,
   a monochrome television camera positioned to observe said model,
   a color television monitor for displaying said scene,
   selective connecting means connecting the video output of said camera to the red, blue, and green color inputs of said monitor,
   first beam splitter means interposed in the optical channel between said model and said camera for dividing light from said model into second and third channels,
   second beam splitter means in said third channel for dividing the light in said third channel into fourth and fifth channels,
   a light filter in each of said fourth and fifth channels,
   and control means responsive to the light in said fourth and fifth channels for controlling said selective connecting means to connect the video signal from said camera to selected ones of said red, blue, and green color inputs to said color monitor in accordance with the color of said spheres.

2. The apparatus of claim 1, said control means comprising:
   a first photodiode responsive to light in said fourth channel,
   a second photodiode responsive to light in said fifth channel,
   and gating means responsive to electrical output signals from said photodiodes for selectively gating the video output signal from said monochrome camera to the red, blue, and green inputs of said color television monitor in accordance with the light in said fourth and fifth channels.

3. The apparatus of claim 2, said gating means comprising:
   a first AND gate responsive to the output signal of said first photodiode,
   a second AND gate responsive to the output signal of said second photodiode,
   a first video gate having an output connection to the red color input of said monitor,
   a second video gate having an output connection to the blue color input of said monitor,
   and a third video gate having an output connected to the green color input to said monitor,
   a video connection to the input of each of said video gates to supply video signals from said camera,
   and a connection from the output of said first AND gate to respective control inputs of said first and second video gates and a connection from the output of said second AND gate to respective control inputs of said second and third video gates to control the gating of video signals to the red, blue, and green inputs of said color monitor.

4. The apparatus of claim 3 and including a variable attenuator in each video connection to each input of said video gates, said attenuators being adjustable to attenuate the video signal applied to the red, blue, and green color inputs of said monitor so that a white light appears at the position of each blue colored sphere in the scene displayed on said monitor.

5. The apparatus of claim 4 and including a green filter in said fourth light channel and a red filter in said fifth light channel.

6. Apparatus according to claim 1, including a. means for rotating said model to selected bearings to bring selected of said spheres into view of said camera and automatically, by said rotation, switch said simulated lights on said monitor to correspond to the colored spheres in view.

* * * * *